United States Patent
Lee et al.

(10) Patent No.: US 12,469,643 B2
(45) Date of Patent: Nov. 11, 2025

(54) MULTILAYER ELECTRONIC COMPONENT

(71) Applicant: SAMSUNG ELECTRO-MECHANICS CO., LTD., Suwon-si (KR)

(72) Inventors: Kangha Lee, Suwon-si (KR); Jin Soo Park, Suwon-si (KR); Yoona Park, Suwon-si (KR); So Eun Choi, Suwon-si (KR); Eun Byeol Choi, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 124 days.

(21) Appl. No.: 18/370,201

(22) Filed: Sep. 19, 2023

(65) Prior Publication Data
US 2024/0186069 A1    Jun. 6, 2024

(30) Foreign Application Priority Data
Dec. 6, 2022  (KR) .................. 10-2022-0168650

(51) Int. Cl.
*H01G 4/232* (2006.01)
*H01G 4/012* (2006.01)
*H01G 4/30* (2006.01)

(52) U.S. Cl.
CPC .......... *H01G 4/2325* (2013.01); *H01G 4/012* (2013.01); *H01G 4/30* (2013.01)

(58) Field of Classification Search
CPC ......... H01G 4/2325; H01G 4/012; H01G 4/30
See application file for complete search history.

(56) References Cited

U.S. PATENT DOCUMENTS

| | | | |
|---|---|---|---|
| 2010/0118467 A1 | 5/2010 | Takeuchi et al. | |
| 2014/0002950 A1* | 1/2014 | Gu | H01G 4/005 29/25.42 |
| 2015/0162132 A1* | 6/2015 | Kwag | H01G 4/2325 361/301.4 |
| 2015/0243439 A1* | 8/2015 | Kwag | H05K 1/181 361/301.4 |
| 2016/0351332 A1* | 12/2016 | Lee | H01G 4/232 |
| 2018/0151296 A1* | 5/2018 | Yamada | H01G 2/065 |
| 2018/0174753 A1* | 6/2018 | Terashita | H01G 4/008 |
| 2021/0065980 A1* | 3/2021 | Jung | H01G 4/005 |
| 2021/0098193 A1* | 4/2021 | Mishima | H01G 2/065 |

FOREIGN PATENT DOCUMENTS

| | | |
|---|---|---|
| JP | 2010-118499 A | 5/2010 |
| KR | 10-2015-0065467 A | 6/2015 |

OTHER PUBLICATIONS

Partial European Search Report issued in corresponding European Patent Application No. 23196331.5 dated Mar. 18, 2024.

* cited by examiner

*Primary Examiner* — Michael P Mcfadden
(74) *Attorney, Agent, or Firm* — MORGAN, LEWIS & BOCKIUS LLP (57) ABSTRACT

An external electrode of a multilayer electronic component includes a base electrode layer and a corner electrode layer disposed at a corner of a body and disposed on the base electrode layer, wherein an area ratio of metal of the corner electrode layer is 90% or more.

19 Claims, 9 Drawing Sheets

MULTILAYER ELECTRONIC COMPONENT

CROSS-REFERENCE TO RELATED APPLICATION

This application claims benefit of priority to Korean Patent Application No. 10-2022-0168650 filed on Dec. 6, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), which is a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mounting. As various electronic devices such as computers and mobile devices have been reduced in size and increased in power, and demand for miniaturization and high capacitance of multilayer ceramic capacitors have been increased.

In addition, various characteristics are required so that electronic components may be driven under environmental conditions, such as high temperature and high humidity.

When forming external electrodes of multilayer ceramic capacitors, a method of dipping exposed surfaces of a body to which internal electrodes are exposed in a conductive paste including a conductive metal is mainly used. However, thicknesses of the external electrodes formed by the dipping method are not uniform, and the external electrode is formed to be excessively thin at the corner of the body, whereas the external electrode is formed to be excessively thick in the central portion of the body. As a result, not only is it difficult to secure capacitance per unit volume of the multilayer ceramic capacitor, but also a plating solution and/or moisture penetrates into the body through the corner portion of the body, thereby reducing reliability of the multilayer ceramic capacitor.

SUMMARY

An aspect of the present disclosure may provide a multilayer electronic component having improved reliability.

An aspect of the present disclosure may also provide a multilayer electronic component having improved high-temperature reliability and moisture resistance reliability.

An aspect of the present disclosure may also provide a multilayer electronic component in which a plating solution and/or moisture are prevented from penetrating into a body, while securing capacitance per unit volume.

According to an aspect of the present disclosure, a multilayer electronic component may include: a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces, a first external electrode including a first base electrode layer disposed on the third surface and extending to and disposed on at least a portion of the first, second, fifth, and sixth surfaces, a first corner electrode layer disposed at the first corner and disposed on the first base electrode layer, and a first plating layer disposed on the first corner electrode layer and disposed to contact at least a portion of the first base electrode layer on the third surface and a second external electrode including a second base electrode layer disposed on the fourth surface and extending to and disposed on at least a portion of the first, second, fifth, and sixth surfaces, a second corner electrode layer disposed at the second corner and disposed on the second base electrode layer, and a second plating layer disposed on the second corner electrode layer and disposed to contact at least a portion of the second base electrode layer on the fourth surface, and a ratio of area occupied by metal in each of the first and second corner electrode layers is 90% or more.

According to another aspect of the present disclosure, a multilayer electronic component may include: a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces, a first external electrode including a first base electrode layer disposed on the third surface and extending to and disposed on at least a portion of the first, second, fifth, and sixth surfaces, a first corner electrode layer disposed at the first corner and disposed on the first base electrode layer, a conductive resin layer disposed on the first corner electrode layer and disposed to contact at least a portion of the first base electrode layer on the third surface, and a first plating layer disposed on the first conductive resin layer and a second external electrode including a second base electrode layer disposed on the fourth surface and extending to and disposed on at least a portion of the first, second, fifth, and sixth surfaces, a second corner electrode layer disposed at the second corner and disposed on the second base electrode layer, a second conductive resin layer disposed on the second corner electrode layer and disposed to contact at least a portion of the second base electrode layer on the fourth surface, and a second plating layer disposed on the second conductive resin layer, and a ratio of area occupied by metal in each of the first and second corner electrode layers is 90% or more.

According to another aspect of the present disclosure, a multilayer electronic component may include: a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces; a first external electrode including a first base electrode layer disposed on the third surface and extending to and disposed on at least a portion of the first, second, fifth, and sixth surfaces, a first corner electrode layer disposed at the first corner and disposed on the first base electrode layer, a first conductive resin layer includes one or more first openings disposed on the first corner electrode layer and disposed to contact at least a portion of the first base electrode layer on the third surface, and a first plating layer disposed on the first conductive resin layer and in contact with the first corner electrode layer via the one or more first openings; and a second external electrode including a second base electrode layer disposed on the fourth surface and extending to and disposed on at least a portion of the first, second, fifth, and sixth surfaces, a second corner electrode layer disposed at the second corner and disposed on the second base electrode layer, a second conductive resin layer including one or more second openings disposed on the second corner electrode layer and disposed to contact at least a portion of the second base electrode layer on the fourth surface, and a second plating layer disposed on the second conductive resin layer and in contact with the second corner electrode layer via the one or more second openings, and a ratio of area occupied by metal in each of the first and second corner electrode layers is 90% or more.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawing, a first direction may be defined as a thickness (T) direction, a second direction may be defined as a length (L) direction, and a third direction may be defined as a width (W) direction.

Figure 1:
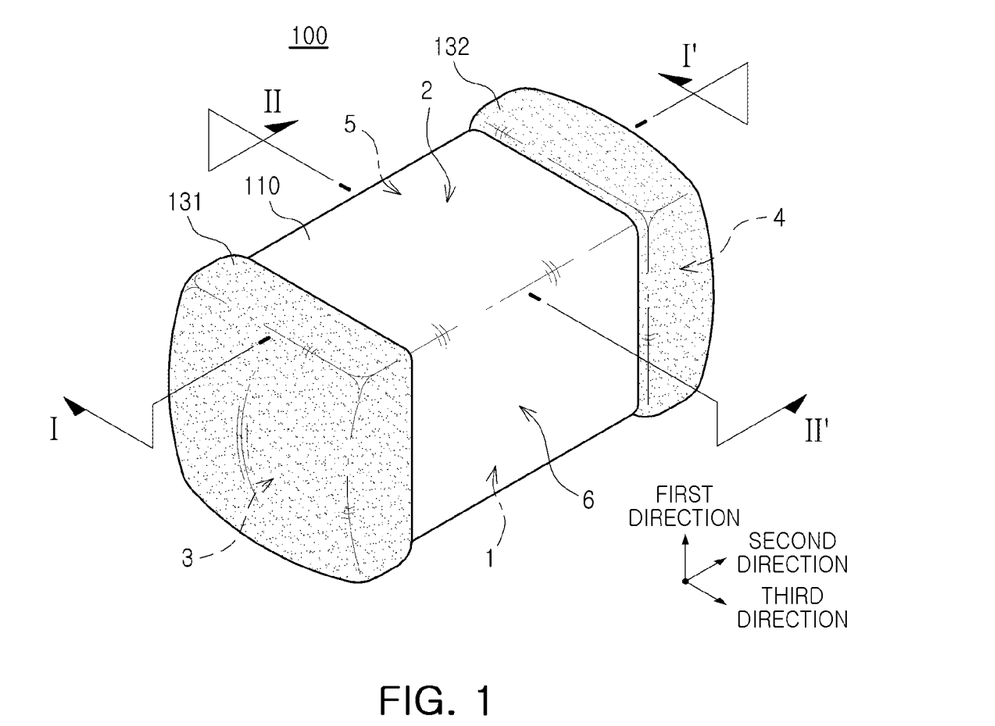
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
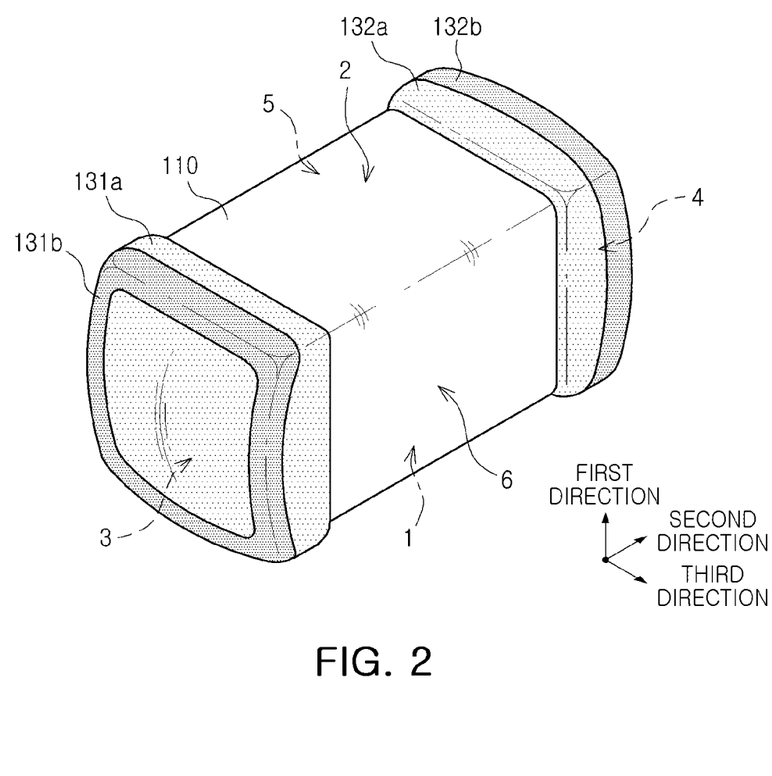
FIG. 2 is a perspective view schematically illustrating a structure of FIG. 1 excluding a plating layer of an external electrode.

FIG. 2 is a perspective view schematically illustrating a structure of FIG. 1 excluding a plating layer of an external electrode.

Figure 3:
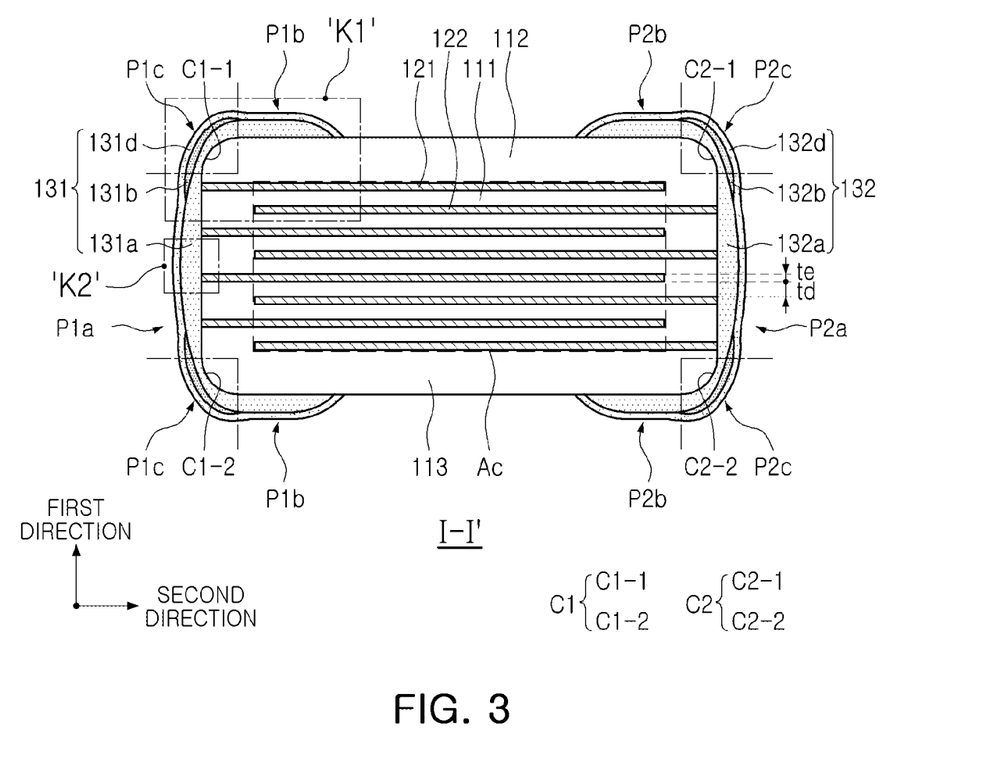
FIG. 3 is a cross-sectional view taken along line I-I' of FIG. 1.

FIG. 3 is a cross-sectional view taken along line I-I' of FIG. 1.

Figure 4:
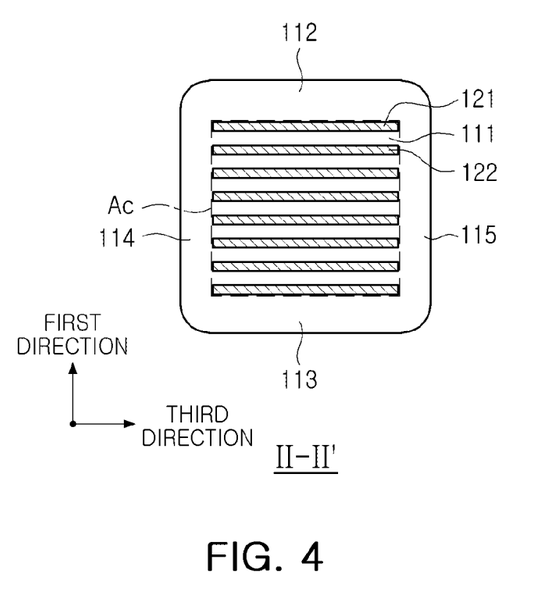
FIG. 4 is a cross-sectional view taken along line II-II' of FIG. 1.

FIG. 4 is a cross-sectional view taken along line II-II' of FIG. 1.

Figure 5:
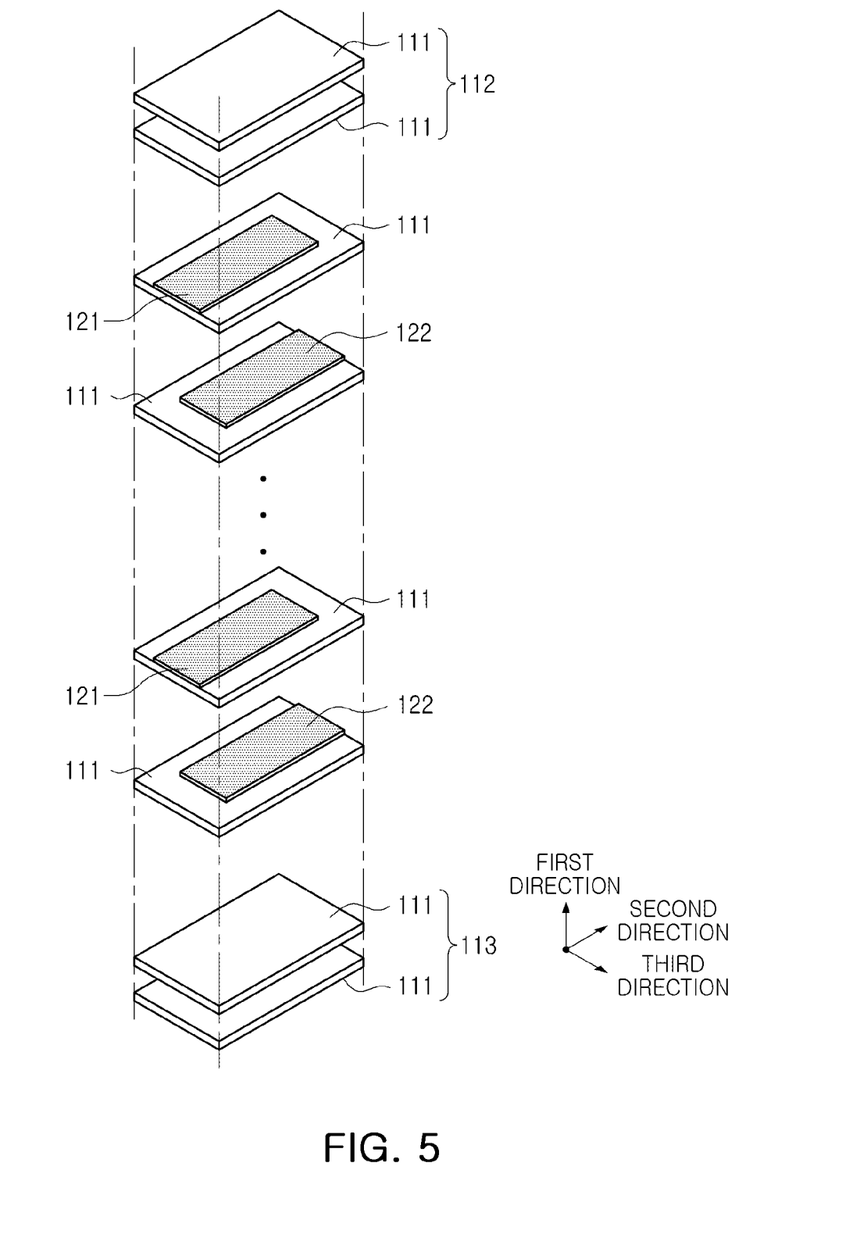
FIG. 5 is an exploded perspective view schematically illustrating a body of a multilayer electronic component according to an exemplary embodiment in the present disclosure.

FIG. 5 is an exploded perspective view schematically illustrating a body of a multilayer electronic component according to an exemplary embodiment in the present disclosure.

Figure 6:
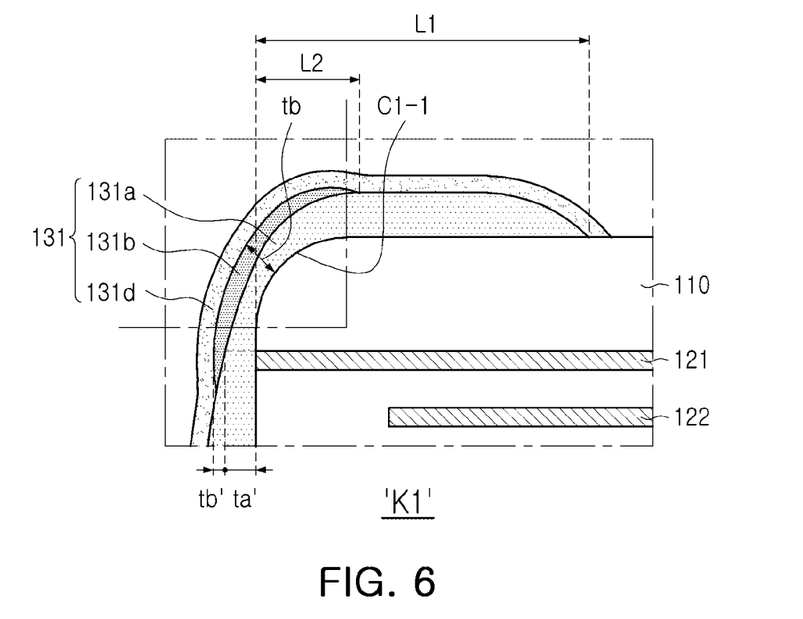
FIG. 6 is an enlarged view of region K1 of FIG. 3.

FIG. 6 is an enlarged view of region K1 of FIG. 3.

Figure 7:
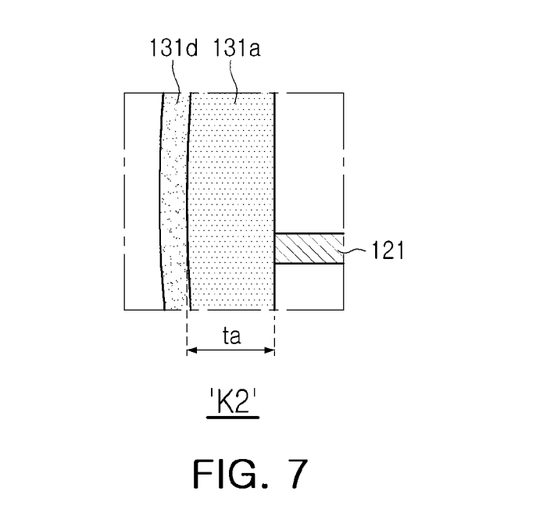
FIG. 7 is an enlarged view of region K2 of FIG. 3.

FIG. 7 is an enlarged view of region K2 of FIG. 3.

A multilayer electronic component 100 according to an exemplary embodiment in the present disclosure may include a body 110 including a dielectric layer 111 and first and second internal electrodes 121 and 122 alternately disposed in a first direction with the dielectric layer interposed therebetween, including first and second surfaces 1 and 2 facing in the first direction, third and fourth surfaces 3 and 4 connected to the first and second surfaces and facing in a second direction, and fifth and sixth surfaces 5 and 6 connected to the first to fourth surfaces and facing in a third direction, and including a first corner C1 connecting the third surface to each of the first, second, fifth, and sixth surfaces and a second corner C2 connecting the fourth surface to each of the first, second, fifth, and sixth surfaces. In some embodiments, a first external electrode 131 includes a first base electrode layer 131a disposed on the third surface and extending to and disposed on at least a portion of the first, second, fifth, and sixth surfaces, a first corner electrode layer 131b disposed at the first corner and disposed on the first base electrode layer, and a first plating layer 131d disposed on the first corner electrode layer and disposed to contact at least a portion of the first base electrode layer on the third surface. In some embodiments, a second external electrode 132 includes a second base electrode layer 132a disposed on the fourth surface and extending to and disposed on at least a portion of the first, second, fifth, and sixth surfaces, a second corner electrode layer 132b disposed at the second corner and disposed on the second base electrode layer, and a second plating layer 132d disposed on the second corner electrode layer and disposed to contact at least a portion of the second base electrode layer on the fourth surface. In some embodiments, in each of the first and second corner electrode layers 131b and 132b, an area ratio occupied by metal is 90% or more.

When forming the external electrodes of the multilayer ceramic capacitor, a method of dipping surfaces of the body to which the internal electrodes of the body are exposed to a conductive paste including a conductive metal is mainly used. However, since the external electrode formed by the dipping method is thinly formed at the corner portion of the body, a plating solution and/or moisture may easily penetrate into the body through the corner portion of the body. In order to prevent this, if the external electrode is formed to be thick, a capacitance per unit volume may be lowered.

According to an exemplary embodiment in the present disclosure, the corner electrode layers 131b and 132b having an area ratio occupied by metal of 90% or more are disposed at the corners C1 and C2 of the body and disposed on the base electrode layers 131a and 132a, thereby preventing penetration of the plating solution and/or external moisture through the corner of the body, while securing the capacitance per unit volume. For example, the area ratio represents a ratio between area occupied by metal in the corner electrode layer (e.g., the corner electrode layer 131b, the corner electrode layer 132 b) and entire area of the corner electrode layer.

Hereinafter, each component included in the multilayer electronic component 100 according to an exemplary embodiment in the present disclosure will be described in more detail.

Although the specific shape of the body 110 is not particularly limited, the body 110 may have a hexahedral shape or a shape similar thereto as illustrated. Due to the shrinkage of ceramic powder included in the body 110 or polishing of the corner portions during a sintering process, the body 110 may not have a perfectly straight hexahedral shape but may have a substantially hexahedral shape.

The body 110 may have the first and second surfaces 1 and 2 facing each other in the first direction, the third and fourth surfaces 3 and 4 connected to the first and second surfaces 1 and 2 and facing each other in the second direction, and fifth and sixth surfaces 5 and 6 connected to the first to fourth surfaces 1, 2, 3, and 4 and facing each other in the third direction. In addition, the body 110 may include a first corner C1 connecting the third surface to each of the first surface, the second surface, the fifth surface, and the sixth surface and a second corner C2 connecting the fourth surface to each of the first surface, second surface, the fifth surface, and the sixth surface.

The first corner C1 may include a 1-1 corner C1-1 connecting the third surface to the first surface and a 1-2 corner C1-2 connecting the third surface to the second surface. The second corner C2 may include a 2-3 corner C2-1 connecting the fourth surface to the first surface, and a 2-2 corner C2-2 connecting the fourth surface to the second surface. In addition, the first corner C1 may include a 1-5 corner connecting the third surface to the fifth surface and a 1-6 corner connecting the third surface to the sixth surface, and the second corner C2 may include a 2-5 corner connecting the fourth surface to the fifth surface and a 2-6 corner connecting the fourth surface to the sixth surface.

The corner may have a round shape by rounding the corner connecting each side of the body 110 by performing a separate process. The first to sixth surfaces of the body 110 may be generally flat surfaces, and non-flat regions may be considered as corners.

In the body 110, dielectric layers 111 and the internal electrodes 121 and 122 may be alternately stacked. The plurality of dielectric layer 111 included in the body 110 are in a fired state, and adjacent dielectric layers 111 may be integrated such that boundaries therebetween may not be readily apparent without using a scanning electron microscope (SEM).

The dielectric layer 111 may be formed by preparing a ceramic slurry including ceramic powder, an organic solvent and a binder, applying the slurry to a carrier film, drying the carrier film to prepare a green sheet, and then firing the ceramic green sheet. The ceramic powder is not particularly limited as long as sufficient capacitance may be obtained, but, for example, barium titanate-based ($BaTiO_3$)-based powder may be used.

An average thickness td of the dielectric layer 111 is not particularly limited, but may be, for example, 10 µm or less. In addition, the average thickness td of the dielectric layer 111 may be arbitrarily set according to desired characteristics or purposes. For example, in the case of electronic components for high-voltage electric devices, the average thickness td of the dielectric layer 111 may be less than 2.8 µm, and in the case of electronic components for small IT devices, the average thickness td of the dielectric layer 111 may be 0.4 µm or less to achieve miniaturization and high capacitance, but the present disclosure is not limited thereto.

In general, as the thickness of the dielectric layer 111 is reduced, cracks are likely to occur in the body 110 due to bending stress occurring when voltage is applied, and the body may be vulnerable to penetration of a plating solution and/or external moisture through the corner of the body. Meanwhile, in the case of the multilayer electronic component according to an exemplary embodiment in the present disclosure, since the corner electrode layers 131b and 132b in which an area ratio of metal is 90% or more are disposed at the corners C1 and C2 of the body and disposed on the base electrode layers 131a and 132a, the reliability of the multilayer electronic component may be improved even when the average thickness td of the dielectric layer 111 is less than 2.8 µm or less than 0.4 µm.

Here, the average thickness td of the dielectric layer 111 refers to the size of the dielectric layer 111 disposed between the internal electrodes 121 and 122 in the first direction. The average thickness of the dielectric layer 111 may be measured by scanning cross-sections of the body 110 in the first and second directions with a scanning electron microscope (SEM) with magnification of 10,000. More specifically, thicknesses at a plurality of points of one dielectric layer 111, for example, at 30 points equally spaced in the second direction, may be measured and an average value thereof may be measured. The 30 equally spaced points may be designated in a capacitance forming portion Ac to be described later. In addition, when the average value is measured by extending the average value measurement to 10 dielectric layers 111, the average thickness of the dielectric layer 111 may be further generalized.

The internal electrodes 121 and 122 may be alternately disposed with the dielectric layer 111. For example, the first internal electrode 121 and the second internal electrode 122, which are a pair of electrodes having different polarities, may be disposed to face each other with the dielectric layer 111 interposed therebetween. The plurality of first internal electrodes 121 and the plurality of second internal electrodes 122 may be electrically separated from each other by the dielectric layer 111 disposed therebetween.

The plurality of first internal electrodes 121 may be spaced apart from the fourth surface 4 and connected to the third surface 3. In addition, the plurality of second internal electrodes 122 may be spaced apart from the third surface 3 and connected to the fourth surface 4.

The conductive metals included in the internal electrodes 121 and 122 may include at least one of nickel (Ni), copper (Cu), palladium (Pd), silver (Ag), gold (Au), platinum (Pt), tin (Sn), and tungsten (W), titanium (Ti), and alloys thereof, but the present disclosure is not limited thereto.

The internal electrodes 121 and 122 may be formed by applying a conductive paste for internal electrodes including a conductive metal to a predetermined thickness on a ceramic green sheet and firing the paste. As a method of printing the conductive paste for internal electrodes, a screen printing method or a gravure printing method may be used, but the present disclosure is not limited thereto.

An average thickness te of the internal electrodes 121 and 122 is not particularly limited, but may be, for example, 3 µm or less. In addition, the average thickness te of the internal electrodes 121 and 122 may be arbitrarily set according to desired characteristics or purposes. For example, in the case of electronic components for high voltage electric devices, the average thickness te of the internal electrodes 121 and 122 may be less than 1 µm, and in the case of electronic components for small IT devices, the average thickness te of the internal electrodes 121 and 122 may be 0.4 µm or less, but the present disclosure is not limited thereto.

Meanwhile, as described above, in the case of the multilayer electronic component according to an exemplary embodiment in the present disclosure, since the corner electrode layers 131b and 132b having an area ratio of 90% or more of metal are disposed at the corners C1 and C2 of the body and disposed on the base electrode layers 131a and 132a, the reliability of the multilayer electronic component may be improved even when the average thickness te of at least one of the plurality of internal electrodes 121 and 122 is less than 1 µm or less than 0.4 µm.

The thickness of the internal electrodes 121 and 122 refers to a size of the internal electrodes 121 and 122 in the first direction. Here, the average thickness of the internal electrodes 121 and 122 may be measured by scanning cross-sections of the body 110 in the first and second directions with a scanning electron microscope (SEM) at a magnification of 10,000. More specifically, thicknesses at a plurality of points of one internal electrode 121 or 122, for example, at 30 points equally spaced in the second direction, may be measured and an average value thereof may be measured. The 30 equally spaced points may be designated in a capacitance forming portion Ac to be described later. In addition, when the average value is measured by extending the average value measurement to 10 internal electrodes 121 and 122, the average thickness of the internal electrodes 121 and 122 may be further generalized.

The body 110 may include the capacitance forming portion Ac disposed inside the body 110 and forming capacitance by including the first and second internal electrodes 121 and 122 alternately disposed with the dielectric layer 111 interposed therebetween and a first cover portion 112 and a second cover portion 113 respectively disposed on both surfaces of the capacitance forming portion Ac facing each other in the first direction. The cover portions 112 and 113 may basically serve to prevent damage to the internal electrodes due to physical or chemical stress. The cover portions 112 and 113 may have the same structure as that of the dielectric layer 111 except that the cover portions 112 and 113 do not include internal electrodes.

The body 110 may include margin portions 114 and 115 disposed on both surfaces of the capacitance forming portion Ac facing each other in the third direction. That is, the margin portions 114 and 115 may refer to regions between both ends of the internal electrodes 121 and 122 and a boundary surface of the body 110 in cross-sections of the body 110 cut in the first and third directions. At this time, the margin portions 114 and 115 may include a first margin portion 114 connected to the fifth surface 5 of the body 110 and a second margin portion 115 connected to the sixth surface 6 of the body 110.

The margin portions 114 and 115 may include the same material as that of the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by applying and firing a conductive paste for internal electrodes on a ceramic green sheet, except where the margin portion is to be formed. Alternatively, in order to suppress a step difference caused by the internal electrodes 121 and 122, after stacking, the internal electrodes 121 and 122 may be cut to be connected to the fifth and sixth surfaces 5 and 6 of the body, and then, a single dielectric layer or two or more dielectric layers may be stacked on both sides of the capacitance forming portion Ac facing each other in the third direction to form the margin portions 114 and 115.

The external electrodes 131 and 132 may be disposed on the third and fourth surfaces 3 and 4 of the body 110, and may extend to portions of the first, second, fifth, and sixth surfaces. In addition, the external electrodes 131 and 132 may include a first external electrode 131 connected to the plurality of first internal electrodes 121 and a second external electrode 132 connected to the plurality of second internal electrodes 122.

In addition, a region of the first external electrode 131 disposed on the third surface may be defined as a first connection portion P1a, a region disposed on the first and second surfaces may be defined as a first band portion P1b, and a region between the first connection portion and the first band portion at the first corner C1 may be defined as a first corner portion P1c, and a region of the second external electrode 132 disposed on the fourth surface may be defined as a second connection portion P2a, a region disposed on the first surface and the second surface may be defined as a second band portion P2b, and a region between the second connection portion and the second band portion at the second corner C2 may be defined as a second corner portion P2c.

The first external electrode 131 may include a first base electrode layer 131a disposed on the third surface and extending to at least a portion of the first, second, fifth, and sixth surfaces, a first corner electrode layer 131b disposed at the first corner and disposed on the first base electrode layer, and a first plating layer 131d disposed on the first corner electrode layer and disposed to be in contact with at least a portion of the first base electrode layer on the third surface, and the second external electrode 132 may include a second base electrode layer 132a disposed on the fourth surface and extending to at least a portion of the first, second, fifth, and sixth surfaces, a second corner electrode layer 132b disposed at the second corner and disposed on the second base electrode layer, and a second plating layer 132d disposed on the second corner electrode layer and disposed to be in contact with at least a portion of the second base electrode layer on the fourth surface.

The first base electrode layer 131a may serve to connect the first internal electrode 121 to the first external electrode 131, and the second base electrode layer 132a may connect the second internal electrode 122 to the second external electrodes 132.

The conductive metal included in the first and second base electrode layers 131a and 132a may not be particularly limited, but for example, the first and second base electrode layers 131a and 132a may include one or more of Ni, Cu, Cr, Sn, Pd, and alloys thereof.

In an exemplary embodiment, the first base electrode layer 131a may be disposed on the third surface and extend to at least a portion of the first, second, fifth, and sixth surfaces. In the first base electrode layer 131a, the regions disposed on the first, second, fifth, and sixth surfaces may be referred to as band portions of the first base electrode layer, the region disposed on the third surface may be referred to as a connection portion of the first base electrode layer, and the region disposed at the corner C1 may be referred to as a corner portion of the first base electrode layer.

The second base electrode layer 132a may be disposed on the fourth surface and extend to at least a portion of the first, second, fifth, and sixth surfaces. In the second base electrode layer 132a, the regions disposed on the first, second, fifth, and sixth surfaces may be referred to as band portions of the second base electrode layer, the region disposed on the fourth surface may be referred to as a connection portion of the second base electrode layer, and the region disposed at the second corner C2 may be referred to as a corner portion of the second base electrode layer.

In an exemplary embodiment, the first and second base electrode layers 131a and 132a may include glass. Accordingly, the first and second base electrode layers 131a and 132a may have excellent bonding strength with the body 110. In this case, the base electrode layers 131a and 132a may be formed by dipping the body into a paste including a conductive metal and glass and then sintering the body.

The corner electrode layers 131b and 132b are basically disposed at the corners C1 and C2 of the body 110.

In general, when the base electrode layers 131a and 132a are formed by a dipping method using a paste including conductive metal and glass, the thickness of the connection portion is the thickest and the thickness of the corner portion becomes thin. In addition, when glass is exposed to an acidic plating solution and moisture, erosion may occur, and when the glass is eroded, a region in which the corner of the body is directly exposed may occur, which may become a path for moisture penetration.

Meanwhile, according to an exemplary embodiment in the present disclosure, the corner electrode layers 131b and 132b having a metal area ratio of 90% or more are disposed at the corners C1 and C2 of the body and on the base electrode layers 131a and 132a, thereby improving moisture resistance reliability, without excessively increasing the thickness of the central region of the external electrodes 131 and 132 in the first direction, and preventing penetration of a plating solution and/or external moisture into the corners C1 and C2 of the body 110, while securing capacitance per unit volume of the multilayer electronic component.

In the corner electrode layers 131b and 132b, an area ratio occupied by metal may be 90% or more. For example, the area ratio represents a ratio of area occupied by metal in the corner electrode layer (e.g., the corner electrode layer 131b, the corner electrode layer 132 b) to entire area of the corner electrode layer (100%). As the corner electrode layers 131b and 132b are disposed on the base electrode layers 131a and 132a, bonding force with the body is not required. Therefore, by setting the area ratio occupied by metal in the corner electrode layers 131b and 132b to 90% or more, erosion caused by a plating solution and moisture may be effectively suppressed, penetration of the plating solution into the corners C1 and C2 of the body 110 when the plating layers 131d and 132d are formed may be effectively prevented, and penetration of external moisture into the corners C1 and C2 of the body 110 may be effectively prevented. More preferably, the area ratio occupied by the metal in the corner electrode layers 131b and 132b may be 95% or more, and even more preferably, 98% or more. That is, it is most preferable that the corner electrode layers 131b and 132b be formed of metal except for unavoidable impurities.

Meanwhile, pores, glass, etc. may be disposed in regions of the corner electrode layers 131b and 132b excluding metal, and it may be more preferable that glass is not included in the regions of the corner electrode layers 131b and 132b except for metal.

In an exemplary embodiment, the first and second corner electrode layers 131b and 132b may substantially consist of metal. Here, the first and second corner electrode layers 131b and 132b substantially consisting of metal may mean that an area ratio occupied by metal in the corner electrode layers 131b and 132b is 98% or more.

The corner electrode layers 131b and 132b may partially include elements diffused from the base electrode layer and oxygen atoms resulting from oxidation during firing, but excluding these elements, the first and second corner electrode layers 131b and 132b may substantially consist of metal. Accordingly, the effect of improving moisture resistance reliability according to the present disclosure may be more remarkable.

In this case, the area ratio occupied by metal in the corner electrode layers 131b and 132b may be calculated from an image scanned using a scanning electron microscope (SEM). Specifically, the area ratio of metal may be measured by polishing the multilayer electronic component to a central position in the width direction (third direction) to expose the cross-section (L-T cross-section) in the length direction and thickness direction and then analyzing an image of the corner electrode layer portion scanned with magnification of 2000 using the SEM. At this time, the area may be measured using an image analysis program, and the image analysis program is not particularly limited. In the image scanned by the SEM, metal, pores, glass, etc. may be distinguished from each other by the difference in shade, and since metal appears as the brightest color, glass appears as dark gray, and pores appears black, they may be easily distinguished from each other with the naked eyes.

In an exemplary embodiment, the first and second corner electrode layers 131b and 132b may not include glass. Since the corner electrode layers 131b and 132b do not include glass, it is possible to fundamentally prevent the glass from being eroded by a plating solution and/or external moisture, so that the effect of improving moisture resistance reliability according to the present disclosure may be more remarkable.

The metal included in the first and second corner electrode layers 131b and 132b may not be particularly limited. For example, the metal included in the first and second corner electrode layers 131b and 132b may be at least one selected from Cu, Ni, Cr, Sn, Pd, and alloys thereof.

Meanwhile, the metal included in the first and second corner electrode layers 131b and 132b may be different from the metal included in the first and second base electrode layers 131a and 132a. However, the present disclosure is not limited thereto, and the metal included in the first and second corner electrode layers 131b and 132b and the metal included in the first and second base electrode layers 131a and 132a may be the same and may include any one of the metal elements included in the base electrode layers 131a and 132a.

In addition, the metal included in the first and second corner electrode layers 131b and 132b may be different from the metal element of the first and second plating layers 131d and 132d. However, the present disclosure is not limited thereto, and the metal included in the first and second corner electrode layers 131b and 132b may be the same as the metal element constituting the first and second plating layers 131d and 132d and may include any one of the metal elements constituting the first and second plating layers 131d and 132d.

The method of forming the corner electrode layers 131b and 132b may not be particularly limited. For example, the corner electrode layers 131b and 132b may be formed by applying a conductive paste including a conductive metal on the corners C1 and C2 of the body 110 and firing the conductive paste. In addition, the corner electrode layers 131b and 132b may be formed by applying a conductive paste including conductive metal but not glass on the corners C1 and C2 of the body 110 and firing the conductive paste.

In an exemplary embodiment, one end portion of the first corner electrode layer 131b may be disposed on the first connection portion P1a, and one end portion of the second corner electrode layer 132b may be disposed on the second connection portion P2a. Accordingly, penetration of the plating solution and/or external moisture into the corners C1 and C2 of the body 110 may be more reliably suppressed.

In this case, the other end portion of the first corner electrode layer 131b may be disposed on the first band portion P1b, and the other end portion of the second corner electrode layer 132b may be disposed on the second band portion P2b. That is, the first corner electrode layer 131b may be disposed to entirely cover the first corner C1, and the second corner electrode layer 132b may be disposed to entirely cover the second corner C2. Accordingly, penetration of the plating solution and/or external moisture into the corners C1 and C2 of the body 110 may be more reliably suppressed.

Furthermore, the corner electrode layers 131b and 132b may be disposed to cover the outermost internal electrode in the first direction. Accordingly, penetration of the plating solution and/or external moisture into the body through the outermost internal electrode may be suppressed.

The plating layers 131d and 132d may improve mounting characteristics. The type of the plating layers 131d and 132d is not particularly limited and may be a plating layer including Ni, Sn, Pd, and/or alloys thereof, and may be formed of a plurality of layers.

The plating layers 131d and 132d may be, for example, a Ni plating layer or a Sn plating layer or may have a form in which a Ni plating layer and a Sn plating layer are sequentially formed. In addition, the plating layers 131d and 132d may include a plurality of Ni plating layers and/or a plurality of Sn plating layers.

The first plating layer 131d may be disposed to contact at least a portion of the first base electrode layer 131a on the third surface, and the second plating layer 132d may be disposed to contact at least a portion of the second base electrode layer 132a on the fourth surface. Accordingly, capacitance per unit volume may be improved by minimizing the thickness of the external electrodes 131 and 132.

In an exemplary embodiment, the first plating layer 131d may be disposed to contact at least a portion of the first base electrode layer 131a on the first, second, fifth, and sixth surfaces, and the second plating layer 132d may be disposed to contact at least a portion of the second base electrode layer 132a on the second, fifth, and sixth surfaces. That is, the first plating layer 131d may be disposed to entirely cover the first corner electrode layer 131b, and the second plating layer 132d may be disposed to entirely cover the second corner electrode layer 132b.

Hereinafter, the first base electrode layer 131a, the first corner electrode layer 131b, and the first plating layer 131d will be described, but since the second external electrode 132 may be symmetrical with the first external electrode 131 in the second direction, and thus, descriptions of the first base electrode layer 131a, the first corner electrode layer 131b, and the first plating layer 131d may also be equally applied to the second base electrode layer 132a, the second corner electrode layer 132b, and the second plating layer 132d.

Referring to FIG. 6, in an exemplary embodiment, when a minimum value of the sum of the thicknesses of the first base electrode layer 131a and the first corner electrode layer 131b at the first corner C1 is tb, tb may be 2 µm or more. When tb is 2 µm or more, penetration of the plating solution and/or external moisture through the first corner C1 of the body 110 may be more effectively prevented.

Here, tb may be the minimum value of the sum of the thicknesses of the first base electrode layer 131a and the first corner electrode layer 131b measured in a direction perpendicular to a surface of a 1-1 corner C1-1 or 1-2 corner C1-2. In addition, tb may be measured by observing the cross-sections of the multilayer electronic component cut in the first and second directions at the center in the third direction using a scanning electron microscope (SEM) with magnification of 3000 fold or greater.

Referring to FIG. 6, when a distance in the second direction from the third surface to the end of the first base electrode layer disposed on the first or second surface is L1 and a distance in the second direction from the third surface to the end of the first corner electrode layer 131b disposed on the first surface or the second surface is L2, L1>L2 may be satisfied. Since the bonding force of the first corner electrode layer 131b with the body 110 is weak, delamination of the first corner electrode layer 131b may be prevented by satisfying L1>L2.

L1 and L2 may be measured by observing cross-sections of the multilayer electronic component cut in the first and second directions in the center in the third direction using a scanning electron microscope (SEM) with magnification of 2000 fold or greater.

Referring to FIGS. 6 and 7, in an exemplary embodiment, when a size of the first base electrode layer 131a in the second direction measured at the center of the body 110 in the first direction is ta and a size of the first base electrode layer 131a in the second direction measured in the outermost internal electrode of the body 110 in the first direction is ta', ta'/ta may be less than 1.

In addition, when the first base electrode layer 131a is formed by a dipping method, it may be difficult for ta'/ta to have a value greater than 0.7, so ta'/ta may be 0.7 or less. When the first base electrode layer 131a is formed by a dipping method, ta'/ta may generally have a value of 0.4 or less.

Even when the ta'/ta is 0.7 or less and the thickness of the first base electrode layer at the corner portion P1c is thin, according to an exemplary embodiment in the present disclosure, the corner electrode layers 131b and 132b in which the area ratio occupied by metal is 90% or more are disposed at the corners C1 and C2 of the body and disposed on the base electrode layers 131a and 132a, and thus, moisture resistance reliability may be secured.

Meanwhile, a lower limit of ta'/ta may not be particularly limited, and for example, ta'/ta may be 0.05 or greater.

Also, referring to FIG. 6, in an exemplary embodiment, when a size of the first base electrode layer 131a in the second direction measured at the center of the body 110 in the first direction is ta, a thickness of the first base electrode layer 131a measured in the outermost internal electrode of the body in the first direction is ta', and a size of the first corner electrode layer 131b in the second direction measured in the outermost internal electrode of the body in the first direction is tb', ta'+tb'<ta may be satisfied.

Accordingly, an increase in the size of the external electrode in the second direction due to the formation of the first corner electrode layer 131b may be suppressed, thereby improving the capacitance per unit volume, while securing moisture resistance reliability.

Also, ta, ta', and tb' may be measured by observing cross-sections of the multilayer electronic component in the first and second directions at the center in the third direction using a scanning electron microscope (SEM) with magnification of 3000 fold or greater.

Hereinafter, a multilayer electronic component according to another exemplary embodiment in the present disclosure will be described. However, the multilayer electronic component according to another exemplary embodiment in the present disclosure may have the same configuration as that of the multilayer electronic component according to an exemplary embodiment in the present disclosure described above. Therefore, descriptions that are the same as those of the exemplary embodiment in the present disclosure will be omitted.

Compared to the multilayer electronic component 100 according to an exemplary embodiment in the present disclosure described above, in a multilayer electronic component 200 according to another exemplary embodiment in the present disclosure, external electrodes 231 and 232 further include conductive resin layer 231c and 232c.

Figure 8:
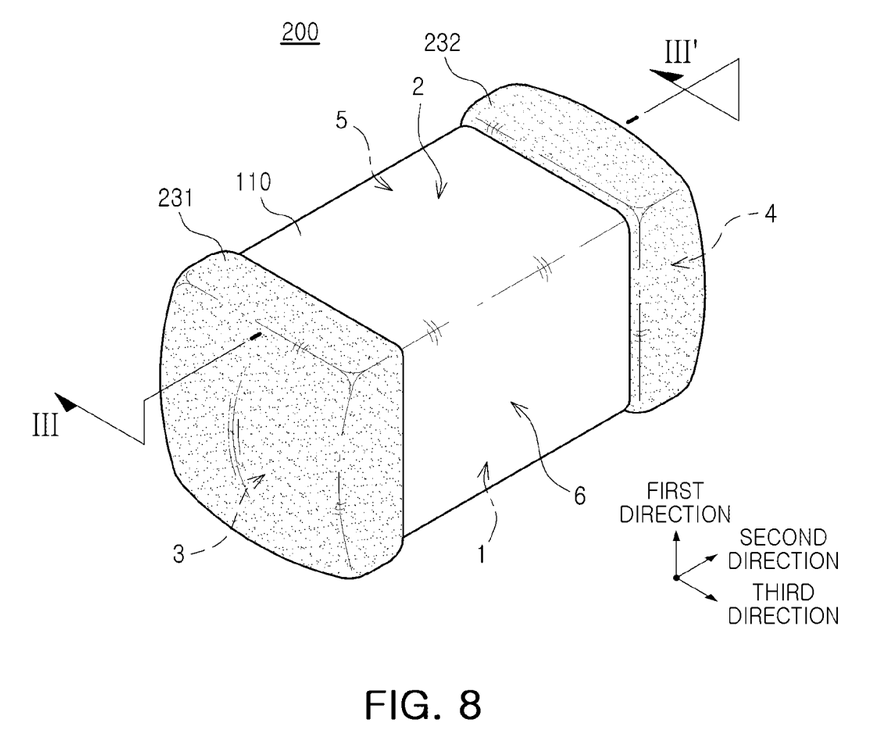
FIG. 8 is a perspective view schematically illustrating a multilayer electronic component according to another exemplary embodiment in the present disclosure.
Figure 9:
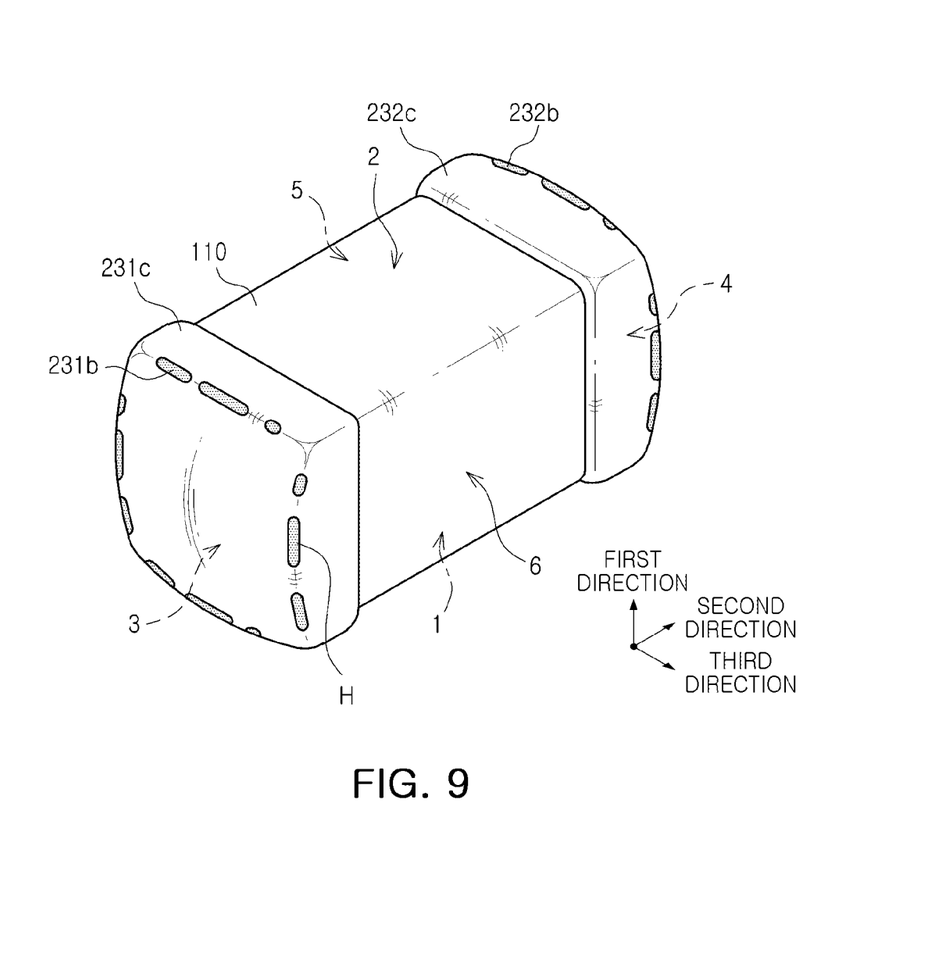
FIG. 9 is a perspective view schematically illustrating a structure of FIG. 8 excluding a plating layer of an external electrode.
Figure 10:
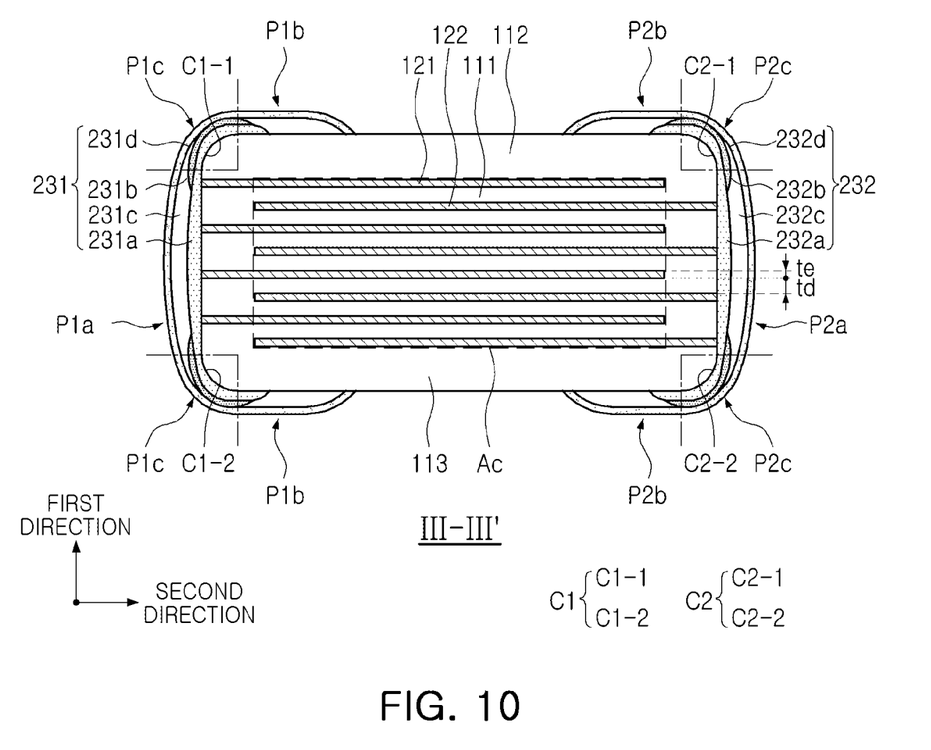
FIG. 10 is across-sectional view taken along line III-III' of FIG. 8.

FIG. 8 is a perspective view schematically illustrating a multilayer electronic component according to another exemplary embodiment in the present disclosure. FIG. 9 is a perspective view schematically illustrating a structure of FIG. 8 excluding a plating layer of an external electrode. FIG. 10 is a cross-sectional view taken along line III-III' of FIG. 8.

Referring to FIGS. 8 through 10, the multilayer electronic component 200 according to another exemplary embodiment in the present disclosure may include a body 110 including a dielectric layer 111 and first and second internal electrodes 121 and 122 alternately disposed in a first direction with the dielectric layer interposed therebetween, including first and second surfaces 1 and 2 facing in the first direction, third and fourth surfaces 3 and 4 connected to the first and second surfaces and facing in a second direction, and fifth and sixth surfaces 5 and 6 connected to the first to fourth surfaces and facing in a third direction, and including a first corner C1 connecting the third surface to each of the first, second, fifth, and sixth surfaces and a second corner C2 connecting the fourth surface to each of the first, second, fifth, and sixth surfaces, a first external electrode 231 including a first base electrode layer 231a disposed on the third surface and extending to and disposed on at least a portion of the first, second, fifth, and sixth surfaces, a first corner electrode layer 231b disposed at the first corner and disposed on the first base electrode layer, a first conductive resin layer 231c disposed on the first corner electrode layer and disposed to contact at least a portion of the first base electrode layer on the third surface, and a first plating layer 231d disposed on the first conductive resin layer, and a second external electrode 232 including a second base electrode layer 232a disposed on the fourth surface and extending to and disposed on at least a portion of the first, second, fifth, and sixth surfaces, a second corner electrode layer 232b disposed at the second corner and disposed on the second base electrode layer, a second conductive resin layer 232c disposed on the second corner electrode layer and disposed to contact at least a portion of the second base electrode layer on the fourth surface, and a second plating layer 232d disposed on the second conductive resin layer. In each of the first and second corner electrode layers, an area ratio of metal is 90% or more.

The conductive resin layers 231c and 232c may include conductive metal and resin. The conductive metal included in the conductive resin layers 231c and 232c may serve to electrically connect the base electrode layers 231a and 232a to the corner electrode layers 231b and 232b. The conductive metal included in the conductive resin layers 231c and 232c is not particularly limited, but may include, for example, one or more of Cu, Ni, Ag, Sn, Cr, and alloys thereof.

The shape of the conductive metal included in the conductive resin layers 231c and 232c may not be particularly limited, but may include, for example, one or more of spherical particles and flake particles.

Here, the spherical particle may include a shape that is not perfectly spherical, and may include a shape in which, for example, a length ratio (major axis/minor axis) between a major axis and a minor axis is 1.45 or less. The flake particles refer to particles having a flat and elongated shape, and are not particularly limited, but, for example, a length ratio between a major axis and a minor axis (major axis/minor axis) may be 1.95 or more.

The lengths of the major and minor axes of the spherical particles and the flake particles may be measured from an image obtained by scanning cross-sections of the multilayer electronic component in the first and second directions at the center in the third direction of the multilayer electronic component with a scanning electron microscope (SEM).

The resin included in the conductive resin layers 231c and 232c may secure bonding and absorb shock. Accordingly, the conductive resin layers 231c and 232c may have relatively high flexibility. Accordingly, the multilayer electronic component may be protected from external physical shock or bending shock, and cracks in the multilayer electronic component may be prevented by absorbing stress or tensile stress applied during mounting on a board.

The resin included in the conductive resin layers 231c and 232c is not particularly limited, but an insulating resin may be used, and for example, one or more of epoxy resin, acrylic resin, and ethyl cellulose may be included.

In an exemplary embodiment, the first plating layer 231d at the first corner C1 contacts at least a portion of the first corner electrode layer 231b, and the second plating layer 232d at the second corner C2 may contact at least a portion of the second corner electrode layer 232b. For example, at least a portion of the first corner electrode layer 231b may contact the first plating layer 231d at the first corner portion P1c, and at least a portion of the second corner electrode layer 232b may contact the second plating layer 232d the second corner portion P2c.

As described above, when the external electrodes 231 and 232 include the conductive resin layers 231c and 232c to prevent cracking due to mounting, equivalent serial resistance (ESR) of a multilayer electronic component increases due to the conductive resin layers 231c and 232c having high resistance.

Meanwhile, in the case of the multilayer electronic component according to an exemplary embodiment in the present disclosure, since at least a portion of the corner electrode layers 231b and 232b are in contact with the plating layers 231d and 232d at the corners C1 and C2 of the body 110, an increase in ESR may be prevented, while cracks due to mounting may be prevented through the conductive resin layers 231c and 232c.

In particular, at least a portion of the corner electrode layers 231b and 232b is in contact with the plating layers 231d and 232d at the corners C1 and C2 of the body 110 spaced apart from the internal electrodes 121 and 122, thereby effectively reducing ESR, without affecting the reliability of the multilayer electronic component.

Meanwhile, a contact point between the corner electrode layers 231b and 232b and the plating layers 231d and 232d may be on the corners C1 and C2 of the body 110 and may not be particularly limited. For example, in at least one of cross-sections obtained by cutting, in the first and second directions, 1/4 points, 2/4 points, and 3/4 points in the third direction of the multilayer electronic component, at least a portion of the corner electrode layer 231b and 232b may contact the plating layers 231d and 232d on the corners C1 and C2 of the body 110.

The method of bringing the corner electrode layers 231b and 232b into contact with the plating layers 231d and 232d may not be particularly limited. For example, referring to FIG. 9, the first conductive resin layer 231c may include a first opening H disposed at the first corner C1 and the first corner electrode layer 231b and the first plating layer 231d may be in contact with each other through the first opening, and the second conductive resin layer 232c may include a second opening disposed at the second corner C2 and the second corner electrode layer 232b and the second plating layer 232d may be in contact with each other through the second opening. That is, the conductive resin layers 231c and 232c may include openings disposed at the corner portions P1c and P2c, and the corner electrode layers 231b and 232b may contact the plating layers 231d and 232d through the opening.

The conductive resin layers 231c and 232c may include one or more openings disposed at the corners C1 and C2 of the body 110, and the openings may have any form as long as the corner electrode layers 231b and 232b and the plating layers 231d and 232d may be in contact with each other therethrough.

The method of forming the openings of the conductive resin layers 231c and 232c is not particularly limited, but, for example, the openings may be formed by applying a conductive resin composition forming the conductive resin layers 231c and 232c on the corner electrode layers 231b and 232b and then removing at least a portion of the conductive resin composition applied to the corners C1 and C2 of the body 110 before the conductive resin composition is cured.

The conductive resin layers 231c and 232c may be disposed on the corner electrode layers 231b and 232b, and at least a portion of the first and second conductive resin layers 231c and 232c may extend onto the first and second surfaces. In addition, at least a portion of the first and second conductive resin layers 231c and 232c may extend onto the fifth and sixth surfaces.

A distance from the third surface to the end of the first conductive resin layer 231c or 232c disposed on the first or second surface in the second direction may be greater than a distance from the third surface to the end of the first base electrode layers 231a and 232a disposed on the first surface or the second surface. Accordingly, the bending strength characteristics may be further improved.

Experimental Example 1

Inventive Example 1 having the structure of a multilayer electronic component according to an exemplary embodiment in the present disclosure shown in FIGS. 1 through 7 was manufactured. Unlike Inventive Example 1, Comparative Example 1 was manufactured except for a corner electrode layer.

Specifically, after preparing a body including a dielectric layer and internal electrodes, the body was dipped into a paste including a conductive metal and glass and then sintered to form a base electrode layer. Thereafter, in Inventive Example 1, a conductive paste including a conductive metal but not glass was applied on the corner of the body on which the base electrode layer was formed and then fired to form a corner electrode layer, and in Comparative Example 1, a corner electrode layer was not formed. Thereafter, a plating layer was formed to prepare a sample chip.

400 sample chips of each of Inventive Example 1 and Comparative Example 1 were manufactured and mounted on a substrate, and then high-temperature reliability and moisture resistance reliability were evaluated, and the results are shown in Table 1 below.

In the case of high-temperature reliability, a voltage of 1 Vr was applied for 12 hours at a temperature of 105° C. and in the case of moisture resistance reliability, a voltage of 0.6 Vr was applied for 12 hours at a temperature of 85° C. and a relative humidity of 85%, and a case in which insulation resistance was dropped by $10^3 \Omega$ or more than an initial value was determined as being defective and the number of defective samples were listed in Table 1.

TABLE 1

| Classification | High-temperature reliability defect | Moisture resistance reliability defect |
| --- | --- | --- |
| Comparative Example 1 | 4/400 | 7/400 |
| Inventive Example 1 | 0/400 | 1/400 |

Referring to Table 1, in the case of Comparative Example 1, four samples had high-temperature reliability defects and 7 samples had moisture resistance defects.

Meanwhile, in the case of Inventive Example 1, there was no sample with high-temperature reliability defects, and one sample had moisture resistance reliability defect, so it can be confirmed that the effect of improving high-temperature reliability and moisture resistance reliability was remarkable compared to Comparative Example 1.

Experimental Example 2

Inventive example 2 having the structure of a multilayer electronic component according to another exemplary embodiment in the present disclosure shown in FIGS. 8 through 10 was manufactured. Comparative Example 2, was manufactured except for the corner electrode layer, unlike Inventive Example 2.

Specifically, after preparing a body including a dielectric layer and internal electrodes, the body was dipped into a paste including a conductive metal and glass and then sintered to form a base electrode layer. Thereafter, in Inventive Example 1, a conductive paste including a conductive metal was applied on the corner of the body on which the base electrode layer was formed and then fired to form a corner electrode layer, and in Comparative Example 1, a corner electrode layer was not formed. Thereafter, after a conductive resin composition was applied, a portion of the conductive resin composition applied to a central region of the corner of the body in the third direction was removed to expose an intermediate electrode layer. Thereafter, curing heat treatment was performed to form a conductive resin layer, and a plating layer was formed on the conductive resin layer to prepare a sample chip.

400 sample chips of each of Inventive Example 1 and Comparative Example 1 were manufactured and mounted on a substrate, and then high-temperature reliability, moisture resistance reliability, and ESR were evaluated, and the results are shown in Table 2 below.

The high-temperature reliability and moisture resistance reliability evaluation methods were the same as that of Experimental Example 1.

ESR was measured using a measuring instrument, and an average value, minimum value, and maximum value at 1 MHz were measured and listed in Table 2 below.

TABLE 2

| Classification | High-temperature reliability defect | Moisture resistance reliability defect | ESR (mΩ) | | |
| --- | --- | --- | --- | --- | --- |
| | | | Average value | Minimum value | Maximum value |
| Comparative Example 2 | 2/400 | 5/400 | 4.87 | 3.24 | 10.68 |
| Inventive Example 2 | 0/400 | 0/400 | 4.21 | 3.16 | 5.34 |

Referring to Table 2, in the case of Comparative Example 2, high-temperature reliability defects occurred in two samples, and moisture resistance reliability defects occurred in five samples.

Meanwhile, in the case of Inventive Example 1, there was no sample with high-temperature reliability defects and moisture resistance reliability defects, and the average and minimum values of ESR were lower than those of Comparative Example 2, and in particular, the maximum value of ESR was half that of Comparative Example 2, confirming that ESR is suppressed compared to Comparative Example 1 and the effect of improving high-temperature reliability and moisture resistance reliability is remarkable.

As one of the various effects of the present disclosure, reliability of the multilayer electronic component may be improved by including the corner electrode layer disposed at the corner of the body and disposed on the base electrode layer.

As one of the various effects of the present disclosure, it is possible to prevent penetration of a plating solution and/or moisture into the body, while securing capacitance per unit volume.

As one of the various effects of the present disclosure, an increase in ESR may be prevented, while preventing cracks due to mounting.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces;
a first external electrode including a first base electrode layer disposed on the third surface and extending to and disposed on at least a portion of the first, second, fifth, and sixth surfaces, a first corner electrode layer disposed at the first corner and disposed on the first base electrode layer, and a first plating layer disposed on the first corner electrode layer and disposed to contact at least a portion of the first base electrode layer on the third surface; and
a second external electrode including a second base electrode layer disposed on the fourth surface and extending to and disposed on at least a portion of the first, second, fifth, and sixth surfaces, a second corner electrode layer disposed at the second corner and disposed on the second base electrode layer, and a second plating layer disposed on the second corner electrode layer and disposed to contact at least a portion of the second base electrode layer on the fourth surface,
wherein a ratio of area occupied by metal in each of the first and second corner electrode layers is 90% or more, and
wherein ta'+tb'<ta, in which ta is a size of the first base electrode layer in the second direction measured at a center of the body in the first direction, and ta' and tb' are sizes of the first base electrode layer and the first corner electrode layer in the second direction measured at an outermost internal electrode of the body in the first direction, respectively.

2. The multilayer electronic component of claim 1, wherein tb is 2 μm or more, in which tb is a minimum value of a sum of thicknesses of the first base electrode layer and the first corner electrode layer at the first corner.

3. The multilayer electronic component of claim 1, wherein the first and second corner electrode layers do not include glass.

4. The multilayer electronic component of claim 1, wherein the first and second corner electrode layers substantially consist of metal.

5. The multilayer electronic component of claim 1, wherein the metal included in the first and second corner electrode layers is at least one selected from Cu, Ni, Cr, Sn, Pd, and alloys thereof.

6. The multilayer electronic component of claim 1, wherein the metal included in the first and second corner electrode layers is different from a metal element of the first and second plating layers.

7. The multilayer electronic component of claim 1, wherein
at least a portion of the first plating layer is disposed to contact the first base electrode layer on the first, second, fifth, and sixth surfaces, and
at least a portion of the second plating layer is disposed to contact the second base electrode layer on the first, second, fifth, and sixth surfaces.

8. The multilayer electronic component of claim 1, wherein
the first external electrode includes a first connection portion disposed on the third surface, a first corner portion disposed at the first corner, and a first band portion disposed on the first, second, fifth, and sixth surfaces, and
the second external electrode includes a second connection portion disposed on the fourth surface, a second corner portion disposed at the second corner, and a second band portion disposed on the first, second, fifth, and sixth surfaces, wherein one end portion of the first corner electrode layer is disposed in the first connection portion, and
one end portion of the second corner electrode layer is disposed in the second connection portion.

9. The multilayer electronic component of claim 8, wherein
the other end portion of the first corner electrode layer is disposed in the first band portion, and
the other end portion of the second corner electrode layer is disposed in the second band portion.

10. The multilayer electronic component of claim 1, wherein the first and second base electrode layers include glass.

11. The multilayer electronic component of claim 1, wherein the ratio of area occupied by the metal in the first corner electrode layer is 98% or more.

12. The multilayer electronic component of claim 1, wherein the ratio of area occupied by the metal in the second corner electrode layer is 98% or more.

13. A multilayer electronic component comprising:
a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces;
a first external electrode including a first base electrode layer disposed on the third surface and extending to and disposed on at least a portion of the first, second, fifth, and sixth surfaces, a first corner electrode layer disposed at the first corner and disposed on the first base electrode layer, a first conductive resin layer disposed on the first corner electrode layer and disposed to contact at least a portion of the first base electrode layer on the third surface, and a first plating layer disposed on the first conductive resin layer; and
a second external electrode including a second base electrode layer disposed on the fourth surface and extending to and disposed on at least a portion of the first, second, fifth, and sixth surfaces, a second corner electrode layer disposed at the second corner and disposed on the second base electrode layer, a second conductive resin layer disposed on the second corner electrode layer and disposed to contact at least a portion of the second base electrode layer on the fourth surface, and a second plating layer disposed on the second conductive resin layer,
wherein a ratio of area occupied by metal in each of the first and second corner electrode layers is 90% or more.

14. The multilayer electronic component of claim 13, wherein tb is 2 μm or more, in which tb is a minimum value of a sum of thicknesses of the first base electrode layer and the first corner electrode layer at the first corner.

15. The multilayer electronic component of claim 13, wherein ta'+tb'<ta, in which ta is a size of the first base electrode layer in the second direction measured at a center of the body in the first direction, and ta' and tb' are sizes of the first base electrode layer and the first corner electrode layer in the second direction measured at an outermost internal electrode of the body in the first direction, respectively.

16. The multilayer electronic component of claim 13, wherein the first plating layer is in contact with at least a portion of the first corner electrode layer at the first corner, and the second plating layer is in contact with at least a portion of the second corner electrode layer at the second corner.

17. The multilayer electronic component of claim 13, wherein
the first external electrode includes a first connection portion disposed on the third surface, a first corner portion disposed at the first corner, and a first band portion disposed on the first, second, fifth, and sixth surfaces, and
the second external electrode includes a second connection portion disposed on the fourth surface, a second corner portion disposed at the second corner, and a second band portion disposed on the first, second, fifth, and sixth surfaces,
wherein one end portion of the first corner electrode layer is disposed in the first connection portion, and
one end portion of the second corner electrode layer is disposed in the second connection portion.

18. A multilayer electronic component comprising:
a body including a dielectric layer and first and second internal electrodes alternately disposed in a first direction with the dielectric layer interposed therebetween, including first and second surfaces facing in the first direction, third and fourth surfaces connected to the first and second surfaces and facing in a second direction, and fifth and sixth surfaces connected to the first to fourth surfaces and facing in a third direction, and including a first corner connecting the third surface to each of the first, second, fifth, and sixth surfaces and a second corner connecting the fourth surface to each of the first, second, fifth, and sixth surfaces;
a first external electrode including a first base electrode layer disposed on the third surface and extending to and disposed on at least a portion of the first, second, fifth, and sixth surfaces, a first corner electrode layer disposed at the first corner and disposed on the first base electrode layer, a first conductive resin layer includes one or more first openings disposed on the first corner electrode layer and disposed to contact at least a portion of the first base electrode layer on the third surface, and a first plating layer disposed on the first conductive resin layer and in contact with the first corner electrode layer via the one or more first openings; and
a second external electrode including a second base electrode layer disposed on the fourth surface and extending to and disposed on at least a portion of the first, second, fifth, and sixth surfaces, a second corner electrode layer disposed at the second corner and disposed on the second base electrode layer, a second conductive resin layer including one or more second openings disposed on the second corner electrode layer and disposed to contact at least a portion of the second base electrode layer on the fourth surface, and a second plating layer disposed on the second conductive resin layer and in contact with the second corner electrode layer via the one or more second openings,
wherein a ratio of area occupied by metal in each of the first and second corner electrode layers is 90% or more.

19. The multilayer electronic component of claim 18, wherein the first and second corner electrode layers do not include glass.

* * * * *